Patented Mar. 6, 1934

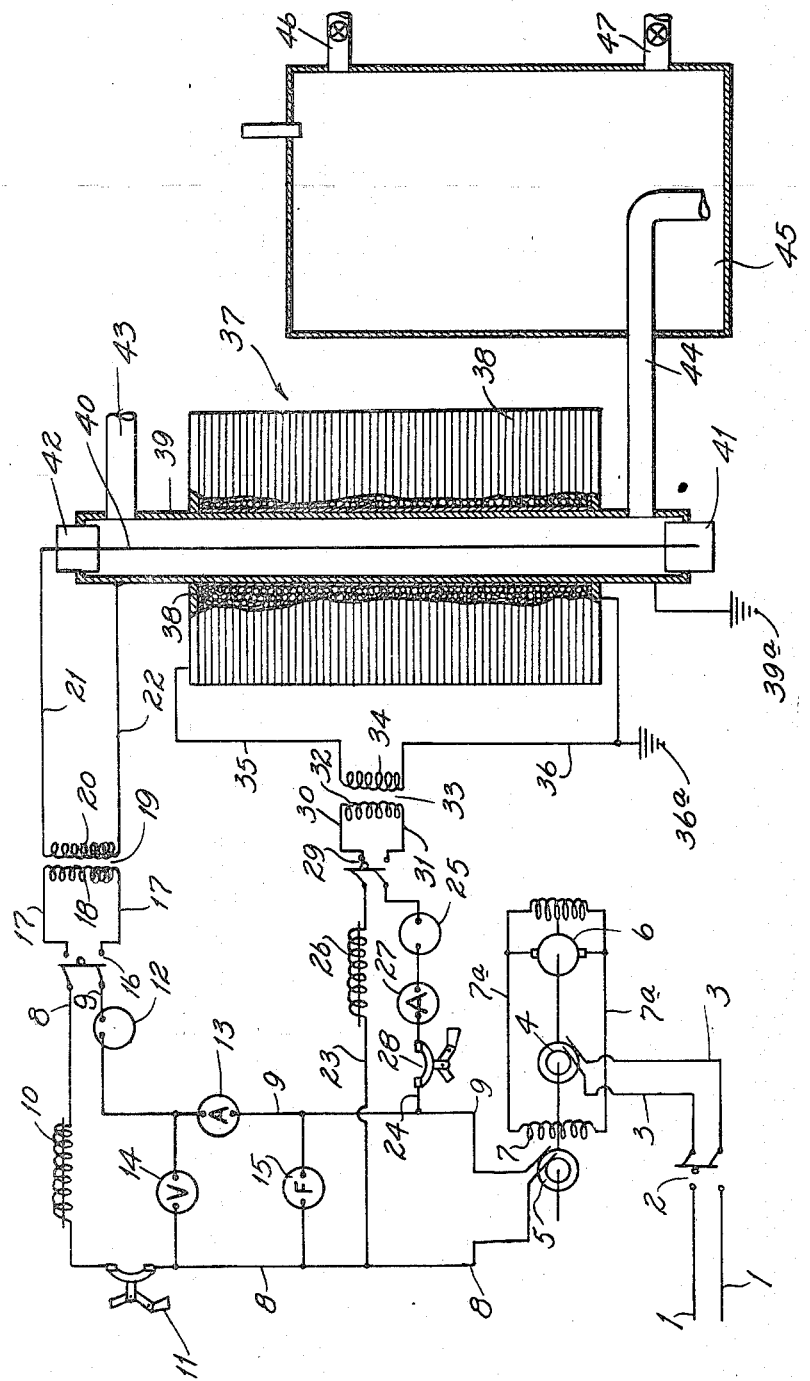

1,949,660

UNITED STATES PATENT OFFICE 1,949,660

PROCESS AND APPARATUS FOR SEPARATING EMULSIONS BY THE COMBINED ACTION OF MAGNETIC AND ELECTRIC FIELDS

Claudius H. M. Roberts, Houston, Tex., assignor, by mesne assignments, to Petroleum Rectifying Company of California, Los Angeles, Calif., a corporation of California Application May 15, 1929, Serial No. 363,199

7 Claims. (Cl. 204—24)

This invention relates to the art of separating emulsions by the combined action of electric and magnetic forces, and particularly, to processes of the kind that are used for "breaking" or separating petroleum emulsions of the water-in-oil type, so as to effect the separation of the component parts of such emulsions; and to apparatus therefor.

My invention resides in the simultaneous application of combined magnetic and electric fields, of suitable kinds and of suitable actual and relative intensities, to an emulsion, for the purpose of separating it into its component non-miscible phases. The magnetic field applied may be of any suitable character, such as uni-directional, or alternating, or may contain both uni-directional and alternating components; the alternating magnetic field, or alternating component of a compound field, having any suitable frequency; the magnetic field, whether uni-directional or alternating or both, having suitable intensity or intensities; and the magnetic field being produced and maintained in any manner suitable for the purpose. The electric field applied may be of any suitable character, such as uni-directional or alternating or may contain both uni-directional and alternating components; the alternating field, or alternating component of a compound field, having any suitable frequency; the electric field, whether uni-directional or alternating or both, having suitable potential or potentials; and the electric field being produced and maintained in any manner suitable for the purpose. The relations of time, space, intensity, angularity and other variables, between the magnetic and electric fields employed, may have any suitable value, which may be either constant or varying and, when varying, may be so continuously or periodically and with any periodicity. The electric field applied is preferably essentially electrostatic in character, that is, it is of such character as to prevent the formation of current carrying paths through the emulsion.

My co-pending applications Nos. 340,855, filed February 18, 1929, 363,197, filed May 15, 1929, and 363,198, filed May 15, 1929, disclose the application, respectively, of alternating electric fields in which the frequency is of special, suitable value; of electric fields containing both uni-directional and alternating components; and of magnetic fields, which may be uni-directional, alternating or may contain both uni-directional and alternating components. Reference is made to those applications for a more detailed statement of the essential characteristics of the electric and magnetic fields utilized in the present process.

The present invention makes use of a suitable magnetic field, with which is combined a suitable electric field, either or both of which fields may be simple or compound, that is, they may be uni-directional, alternating or may contain both uni-directional and alternating components, for the purpose of realizing certain unforseen and unexpected advantages, peculiar to the combination. Among these advantages may be cited the use of magnetic and electric fields having lower intensities, or lower frequencies, or both, than are effective with either kind of field alone and, especially, by employing suitable values of the time, space, intensity, angularity and other relations between the magnetic and electric fields, of still further reducing the intensities, or frequencies, or both, required for the two kinds of fields; as well as other advantages which will be apparent and all of which tend toward the end of more easily, quickly, economically and effectively accomplishing the resolution of emulsions as well as effecting the successful separation of emulsions which cannot be resolved by any other method.

The relations between the magnetic and electric fields, which give the optimum results in resolving a given emulsion, can be determined in various ways, but the method of making practical tests on the emulsion is probably the most convenient and simple. In following this method, it is best to determine the optimum conditions for the magnetic and electric fields separately. In doing this, with the electric field, for example, tests are made to determine (1) the range of frequencies within which treatment is possible at the lowest potentials, which I will call the "critical frequency range", and (2) that frequency, within this range, which permits treatment at the minimum potential, which frequency I will call the "optimum frequency". Having accomplished these tests for alternating potentials, the next step is to redetermine (1) and (2) for superimposed uni-directional and alternating electric fields. From these tests, the optimum uni-directional and alternating potentials and the optimum frequency for the alternating component are determined. The process is then repeated for alternating magnetic fields and then for superimposed alternating and uni-directional magnetic fields. Then, using both magnetic and electric fields, each of which has the optimum characteristics, the relative orientations and spacings of the two fields, relative to the emulsion, are determined.

If desired, the characteristics of the magnetic and electric fields may then be varied, to determine whether, for the combination of fields, other characteristics than the optimum for either alone may be better for the combination. This, however, is not generally the case. Also, in general, the best results are obtained with the magnetic field approximately ninety degrees to the electric field and completely superimposed upon it, and with the electric field parallel to the direction of flow of the emulsion through the treating apparatus.

In the practice of my process, I usually prefer, for reasons of convenience and simplicity, to realize the creation of the combined magnetic and electric fields by the use of independent sources of magnetic and electrical energy. I may, however, create the desired combined magnetic and electric fields by the use of a single source of electrical energy, the voltage component of which is used to create the electric field, while the current component is suitably employed to energize the magnetic field. In general, however, independent sources of magnetic and electric energy will be found more suitable, as the independent control of their frequencies, intensities, time-phase relations, etc. will be found more convenient. The magnetic and electric fields may be produced in any manner desired, any suitable sources of energy being employed, such as generators, vacuum tube frequency generators, frequency transformers, tuned frequency circuits, commutating devices, rectifiers, including mechanical rectifiers, vacuum tube rectifiers, etc., or other sources of electrical energy.

Various types and kinds of apparatus may be used to carry out or practice my process. The accompanying drawing illustrates one suitable form of apparatus, which is provided with a generator, which constitutes the source of special frequency power. For simplicity, this drawing describes an application of my process in which the magnetic and electric fields are at right angles, in which only alternating magnetic and electric fields are employed and in which both fields have the same frequency. For applications where uni-directional components are required, direct current generators may also be employed, one being of suitable high voltage for the electric field and the other of low voltage for the magnetic field, or the uni-directional power required may be produced by the use of suitable rectifiers.

In the drawing, 1, 1 designate the commercial electric supply mains, from which the operating power is drawn, 2 designates the line switch, connected by wires 3, 3 to a motor 4, of characteristics suited to the commercial power available, which motor is preferably mounted on the same shaft as the alternating frequency generator 5 and the direct current generator 6. The alternating frequency generator 5 may produce a voltage of sinusoidal or other desirable wave form and is supplied with excitation current by direct current generator 6, which is connected by wires 7a, 7a to the field coils 7, of frequency generator 5. The output circuit of generator 5 is suitably connected, by wires 8 and 9, to a current regulating or limiting device 10, a circuit breaker 11, a commutating device 12, an ammeter 13, a voltmeter 14, a frequency meter 15 and a switch 16, all substantially as shown. Also suitably connected to wires 8 and 9, in the output circuit of generator 5, as shown by wires 23 and 24, are a commutating device 25, a current regulating or limiting device 26, an ammeter 27, a circuit breaker 28 and a switch 29, all substantially as shown. Switch 16 serves to connect the output circuit of generator 5, by wires 17, 17 to one coil 18, of a suitable voltage transformer 19, the other coil 20, of which, is connected by wires 21 and 22, respectively, to the insulated and grounded electrodes of a suitable treating apparatus, to be subsequently described. Switch 29 serves to connect the output circuit of generator 5, by wires 30 and 31, to one coil 32, of a suitable transformer 33, the other coil 34, of which, is connected by wires 35 and 36, respectively, with the terminals of a suitable electromagnet, which forms a part of the treating apparatus to be subsequently described. The commutating devices 12 and 25, previously mentioned, may be of any type and are provided for the purpose of enabling the use, independently in each circuit of which they form a part, of any portion of the voltage wave produced by generator 5, to permit the periodic interruption of either circuit at any desired time interval, to permit the rectification of either circuit, to produce a periodically varying uni-directional voltage, to effect a change in the frequency of either circuit, either independently or in synchronism, or to effect a change in the wave form of the generated voltage; the type of the devices employed and the use to which they are put being conditioned by the characteristics of the emulsion upon which they are to be used. The apparatus in which the emulsion is broken or separated may, conveniently, be of the form shown at 37, which consists of a suitable electro-magnet winding 38, surrounding an essentially axial metallic conduit 39, within which is disposed, also essentially axially, a metallic conductor 40, which is insulated from the rest of the apparatus by suitable insulating blocks 41 and 42. The conduit 39 is connected at its ends to pipes 43 and 44, respectively, and forms the channel through which the emulsion is passed during its subjection to the action of the combined magnetic and electric fields, to effect the coalescence of the dispersed phase of the emulsion. The metallic conduit 39, which is preferably grounded, as shown at 39a, is connected to wire 22 and the metallic conductor 40 is connected to wire 21, both in the output circuit of transformer 19, as previously described. The terminals of the electromagnet winding 38 are connected to wires 35 and 36, respectively, in the output circuit of transformer 33, as previously described, and the wire 36 is also preferably connected to ground, as shown at 36a. The emulsion to be separated is delivered to the treating apparatus through pipe 43, passing thence through the treating apparatus, through conduit 39, leaving it through pipe 44 and being delivered into the bottom of a suitable settling tank 45, of well known design, in which the coalesced liquids are permitted to separate by gravity and from which they may be separately withdrawn through pipes 46 and 47, respectively.

In operation, the emulsion is permitted to flow continuously, and at a suitable rate, through pipe 43 into the treating apparatus and thence through the apparatus, through conduit 39. Switch 2, on the commercial power supply lines 1, 1 is closed, thereby starting motor 4 and the generators mechanically connected thereto. The speed of motor 4 is suitably regulated, by apparatus not shown, until frequency meter 15, in the output circuit of generator 5, indicates the desired frequency, and the current in field coils 7, of generator 5, is adjusted, by regulating the output of generator 6, by apparatus not shown, until the desired output voltage of generator 5 is indicated by voltmeter 14. Circuit breaker 11 and switch 16 are then closed, thereby energizing transformer 19 and impressing its output voltage upon the space between conductor 40 and conduit 39, of the treating apparatus. Circuit breaker 28 and switch 29 are then closed, thereby energizing transformer 33 and the electromagnet 38, which forms a part of the treating apparatus, and creating a magnetic field in the conduit 39. Commutating devices 12 and 25 may be operated or not as desired, according to the intensity-frequency relations, between the magnetic and electric fields, which may be required for the particular emulsion. The combined magnetic and electric fields, which are in this case at right angles to each other, being impressed upon the emulsion flowing through the conduit 39, effect the coalescence of the particles of the dispersed phase. The coalesced liquids then flow out of the treating apparatus through pipe 44 and are delivered into the bottom of settling tank 45, in which they are permitted to separate by gravity and from which they are withdrawn, as desired, through pipes 46 and 47, respectively.

In treating certain emulsions, which, due to various causes, may be more or less resistant to the action of the combined magnetic and electric fields, or in treating mixed emulsions, such as "tank bottoms" or mixtures of fresh emulsions, it is sometimes necessary to subject the emulsion to repeated action of the combined fields, either at the same or at different frequencies and at the same or at different intensities. It will sometimes be necessary to vary the characteristics of the magnetic field, while keeping the electric field the same as in the first application, or vice versa, or it may even be necessary to change the characteristics of both fields, in order to obtain the most favorable results. Such repeated action of the magnetic and electric fields may be secured in the same or in different apparatus, as may be most suitable under the circumstances. In the event that different characteristics of either or both the magnetic and electric fields are required, those characteristics are determined, as previously described, for each component of the mixed emulsion.

In the foregoing description of my process, it is to be distinctly understood that I do not limit myself in any manner to the method or apparatus herein disclosed for practicing the process; the only essential feature of the process being the subjection of the emulsion to be separated to the combined action of magnetic and electric fields. The magnetic and electric fields may have any suitable actual or relative intensities, any suitable actual or relative periodicities, and any suitable actual or relative orientations with reference to the direction of motion of the emulsion through the fields. The magnetic and electric fields may be produced in any manner and the emulsion, which may consist of any two or more non-miscible liquids, may be subjected to the action of the combined magnetic and electric fields in any suitable form of apparatus, the component liquids being separated into continuous phases either within said apparatus, or subsequently, in any other suitable apparatus. The process may be used for the separation of emulsions in which the outer, or continuous, phase is electrically conducting, by interposing a continuous barrier of insulating material between the electrically energized elements in the treating apparatus. While my process is particularly adapted for breaking or separating petroleum emulsions of the water-in-oil type, it is not limited to such use, but is capable of use for resolving other types and kinds of natural and artificial emulsions.

If desired, my improved process may be used in conjunction with certain processes, apparatus, or procedure heretofore used in the treatment of petroleum emulsions, such, for example, as processes, apparatus, or procedure which effect or have for their purpose: homogenization of the emulsion with steam or by mechanical means; re-emulsification with added water or brine; reduction of water content by addition and suitable incorporation of un-emulsified oil of the same or different characteristics from the oil in the emulsion; addition and incorporation with the emulsion of lighter oil, in order to reduce the viscosity of the emulsion; the use of heat or pressure or both, to facilitate the action of the combined magnetic and electric fields; the use of agitation, produced by any means, during, before or subsequent to the treatment; the repeated subjection of the emulsion to the combined magnetic and electric action, either in the same or in different apparatus and at the same or different intensities from those first employed; the subjection of the emulsion to the combined magnetic and electric action in a field of varying magnetic intensity or of varying electrical potential, which intensity or potential may vary continuously or periodically between any desirable limits or which may be varied manually as desired; the use of filtration, either within or outside the treater, as an aid to the action; the use of centrifugal force, either during or subsequent to the combined magnetic and electric action; the use of moving magnetic or electric fields, controlled by any means, to facilitate the treatment; the prevention or control of disruptive current surges or "short circuits" through the emulsion under treatment, by electrical, magnetic, mechanical or other means; fire prevention by mechanical, electrical, or chemical means; mixing untreated or partially treated emulsion with other emulsion prior to treatment or recycling the same through the treater to subject it to repeated action of the magnetic and electric fields; control of fluid level or water level in the treater, or the use of the same to control other apparatus, such as power supplied to the treater or water or fluid withdrawn from the treater; insulation protection of the electrically-energized elements of the treater or of any auxiliary apparatus; the use of electrodes or treaters of particular or specially desirable design; the separation of the component phases of the emulsion, either partially or completely, prior to, during or subsequent to the magnetic and electric treatment, either in the treater or in auxiliary apparatus of any form; or addition to the emulsion to be separated of any suitable chemicals, added either prior to or during the combined magnetic and electric action, for the purpose of altering any properties of the components of the emulsion, such as conductivity, surface tension, dielectric constant, solubility, magnetic susceptibility, viscosity, etc., so as to render the emulsion more susceptible to separation by the combined magnetic and electric forces.

Having thus described my invention, what I claim as new and desire to secure by Letters Patent is:

1. A process of separating the phases of an emulsion, which process includes the steps of: establishing an essentially electrostatic field in a treating space containing the emulsion to be treated whereby no short-circuiting current-conducting paths extend across said treating space due to a chaining up of the dispersed particles of the emulsion; and subjecting the emulsion in said treating space to the action of a magnetic field the areas of greatest intensities of said fields being substantially coextensive.

2. A process of separating the phases of an emulsion by the use of concentric electrodes, which method includes the steps of: impressing a potential difference between said electrodes to establish an electric field therebetween which is highly concentrated adjacent the inner electrode due to the concentric nature of said electrodes; and establishing a magnetic field in such position as to send magnetic flux longitudinally through the treating space between said concentric electrodes.

3. A process as defined in claim 2 including the step of flowing said emulsion longitudinally through said treating space in a direction parallel to the direction said magnetic flux moves through said treating space.

4. In an apparatus for treating an emulsion, the combination of: a solenoid providing a passage therethrough and adapted when energized to set up a strong magnetic field through said passage; a pair of electrodes positioned in said passage so as to be surrounded by said solenoid; means for supplying emulsion to said passage and into the space between said electrodes; means for establishing a potential difference between said electrodes; and means for energizing said solenoid.

5. In an apparatus for treating an emulsion: a pair of concentric electrodes defining a treating space; means surrounding said treating space for setting up a magnetic field therein; means for delivering the emulsion to be treated to said treating space; and means for energizing said electrodes to set up an electric field therebetween whereby said emulsion in said treating space is subjected both to electric and magnetic fields.

6. In an apparatus for treating an emulsion, the combination of: a solenoid adapted when energized to set up a strong magnetic field through a central space thereof; a pair of electrodes positioned in said central space; means for supplying emulsion to said central space between said electrodes; means for establishing a potential difference between said electrodes, said means including a periodically operating current-interrupting device; and means for energizing said solenoid.

7. In an apparatus for treating an emulsion, the combination of: a solenoid adapted when energized to set up a strong magnetic field through a central space thereof; a pair of electrodes positioned in said central space; means for supplying emulsion to said central space between said electrodes; means for establishing a potential difference between said electrodes, said means including a periodically operating current-interrupting device; and means for energizing said solenoid, said means including a periodically operating current-interrupting device whereby the time relationship between the periods of energization of said solenoid and the period of energization of said electrodes can be changed.

CLAUDIUS H. M. ROBERTS.